United States Patent

Titus

[15] 3,693,872

[45] Sept. 26, 1972

[54] ACRONAV : AN INTEGRATED FLIGHT DATA AIR NAVIGATION COMPUTER SYSTEM

[72] Inventor: Jack B. Titus, 132 Elliott Drive, Mather AFB, Calif. 95655

[22] Filed: Sept. 9, 1971

[21] Appl. No.: 178,987

[52] U.S. Cl. ................................235/78, 235/61 NV

[51] Int. Cl. ..............................................G06c 27/00

[58] Field of Search.......................235/78, 88, 61 NV

[56] References Cited

UNITED STATES PATENTS

| | | | |
|---|---|---|---|
| 3,360,195 | 12/1967 | Fisher | 235/78 |
| 3,471,084 | 10/1969 | Titus | 235/78 |
| 3,497,681 | 2/1970 | Warner | 235/78 |
| 3,569,994 | 3/1971 | Rau | 235/78 |
| 3,609,299 | 9/1971 | Wright | 235/78 |
| 3,630,435 | 12/1971 | Titus | 235/78 |

*Primary Examiner*—Stephen J. Tomsky
*Attorney*—Harry A. Herbert, Jr. et al.

[57] ABSTRACT

An air navigation computer having a calculator side consisting of a lower disc inscribed with log-distance, compressibility, Mach number and temperature error scales; a central disc inscribed with "TRUE AIR SPEED/GROUND SPEED" and having log-time, density altitude and temperature scales, and a Mach number and temperature error window; and an upper disc having a density altitude window, a pressure altitude scale and an equivalent-calibrated air speed cursor assembly. A computer-wind side includes a relative bearing-cursor assembly disc that is laminated to the reverse side of the calculator side-lower disc and is inscribed with "TRUE AIR SPEED/GROUND SPEED" and radially-aligned wind drift and course indices at the 180° relative bearing value with a radial cursor line extending between the wind drift and true air speed/ground speed indices. A trig-log scale-inscribed disc is interposed between the relative bearing-cursor assembly disc and the calculator-lower disc, and a compass indicator disc is mounted on the relative bearing-cursor assembly disc.

10 Claims, 10 Drawing Figures

INVENTOR.
JACK B. TITUS
BY Harry A. Herbert Jr
ATTORNEY
Arthur R. Parker
AGENT

INVENTOR.
JACK B. TITUS
BY Harry A. Herbert Jr
ATTORNEY
Arthur R. Parker
AGENT

INVENTOR.
JACK B. TITUS
BY Harry A. Herbert Jr
ATTORNEY
Arthur R. Parker
AGENT

INVENTOR.
JACK B. TITUS
BY Harry A. Herbert Jr.
ATTORNEY
Arthur R. Parker
AGENT

INTEGRATED FLIGHT DATA AIR NAVIGATION COMPUTER SYSTEM

BACKGROUND OF THE INVENTION

This invention relates generally to the field of hand-held, air navigation computers and, in particular, to a further development of a previous computer, invented by the present applicant and described and claimed in a copending patent application, Ser. No. 40,062, filed on May 25, 1970, now U.S. Pat. No. 3,630,435 on an invention entitled, "AEROTRACK: An Air Navigation Triangulation Computer". The latter invention constitutes an improvement over still another invention described and claimed in patent application Ser. No. 708,909, filed by applicant on Feb. 28, 1968, on an invention entitled, "Trigonometric Aeronautical Computer, TRAC", and subsequently issued on Oct. 7, 1969 as U.S. Pat. No. 3,471,084.

In the basic form of air navigation known as "dead reckoning"; the instantaneous position of the aircraft being so navigated is determined from a continuous plot of the track and average ground speed of the aircraft with the elapsed time from a known departure and/or intermediate check point or turning position along the track. This determination of the position of the aircraft may be derived from what is commonly known as the "wind triangle" in which vectors may be plotted that represent the selected true course, wind, and true air speed of the aircraft. Although this wind triangle of vectors may be hand-drawn to scale, it is much more desirable and perhaps even necessary to use the hand-held-type of air navigation computer, particularly where the faster and longer range-types of aircraft are involved. Such computers, many of which have been in use for numerous years, generally employ the circular slide rule principle and incorporate both a so-called "wind" side and a "calculator" side. On the wind side, the aforementioned "wind triangle of vectors", including the true air speed and selected true course of the aircraft, and the known wind speed and direction, may be readily represented, and the true heading and ground speed of the aircraft, and the wind drift correction or crab angle rather easily determined therefrom.

As is well-known, the aforementioned "true" air speed is initially and customarily determined from the previously-noted, "calculator" side of the computer by correcting the "calibrated" air speed for temperature and altitude corrections. For rough navigation purposes, the error in the aforesaid "calibrated" air speed which is, of course, the "indicated" air speed read on the airspeed indicator adjusted for instrument and installation errors, may be corrected by the equally well-known "rule of thumb", which states that one should "add 2 percent per thousand feet" to the calibrated air speed to obtain the true air speed. This rule works good generally for altitudes up to 10,000 feet, but for closer tolerances and altitudes above this level the hand-held computer should be used. Moreover, the computer takes into consideration any deviation of temperature and pressure from the "normal lapse rate", which the aforementioned "rule of thumb" ignores. For this purpose, the previously-referred to computer-calculator side is used to determine the true air speed and then this flight data, along with the selected true course and known wind, is placed on the wind side of the computer.

Previously-developed air navigation computers have included a slidable member on the "wind" side, as in the case of the well-known "E6–B", which slidable member is inscribed, for example, with units of speed and wind drift correction angles and which is cooperatively related to a circular and rotatable, angle-inscribed member on which may be set both the wind direction and true course during certain steps in the operation thereof. Other computers, such as is depicted in U. S. Pat. Nos. 2,775,404 and 3,497,681, have eliminated the use of such a slidable member and are thereby designed to make a more compact system of scales. The present invention involves a computer mechanism that is considered unique over these previously developed computers, in that it involves a further development, as noted hereinbefore, of two other inventions made by the present applicant and respectively described and claimed in the previously noted U.S. Pat. No. 3,471,084 and patent application, Ser. No. 40,062. In this regard, the mechanism of U.S. Pat. No. 3,471,084 and also patent application, Ser. No. 40,062 constitutes improvements in, and are thus designed to replace the "wind" side of existing computers. Both of these devices involve the development of a unique system of trig-log scales in novel, cooperative arrangement both with standard log scales and compass indicator and novel relative bearing elements. In the former, a unique combination of reference cursor elements are also utilized, whereas in the latter, a further improved master cursor assembly is used in novel slaved relation to the compass indicator and wind direction pointer elements. On the other hand, the arrangement of the present invention comprises a novel computer involving principally the further development of the"calculator" side thereof that is improved in the unique manner and clearly offers advantage over previously-developed computers, as will appear self-evident in the following summary and detailed description thereof.

SUMMARY OF THE INVENTION

The present invention consists primarily in an improved three-disc, computer-calculator side-mechanism including a first, bottom disc member having log-distance, compressibility, Mach number and temperature error scales, and further incorporating a first arc segment extension on a portion of the disc-circumference and centered on a log-distance/speed scale value of "60"; a second, central disc member rotatably positioned on top of the first disc and having log-time and density altitude scales, a Mach number and temperature error window, and a second arc segment centered on the log-time-scale value of "60" and extending from a portion of the disc-circumference, and inscribed with "TRUE AIR SPEED/GROUND SPEED"; and a third, top disc member having a pressure altitude scale, a density altitude window and an equivalent-calibrated air speed cursor assembly including a third arc segment extension positioned on a portion of the disc-circumference and bisected by a cursor line.

The above-summarized computer-calculator side-mechanism may preferably be applied to, or combined with a wind-side-mechanism to thereby form a complete computer and which includes a fourth, disc member inscribed with trig-log scales and rotatably mounted to the reverse side of the first, bottom-calculator-side disc member; and a fifth, combined relative bearing-and-cursor assembly disc member incorporating a main disc-body having a relative bearing scale, wind drift and course indices radially aligned with the 180° relative bearing angle, and oppositely disposed arc segments of unequal length and extending from the disc body-circumference. These arc segments are fixed to the underside of the calculator-side, first disc member for simultaneous rotation therewith, and the longer of the two segments is inscribed with "TRUE AIR SPEED/GROUND SPEED" and has a bisecting cursor line inscribed thereon and also radially aligned with the 180° relative bearing angle. A trig-log-inscribed scale-disc member and a standard compass indicator disc member are respectively mounted between, and on top of, the relative bearing-cursor assembly disc member. A second standard logarithmic-distance/speed scale is inscribed on the reverse side of the second, central disc member.

Certain advantages, as well as objects, of the invention will readily appear hereinafter in connection with the following disclosure thereof, taken in connection with the accompanying drawings, in which:

DESCRIPTION OF THE PREFERRED EMBODIMENT

Figure 1:
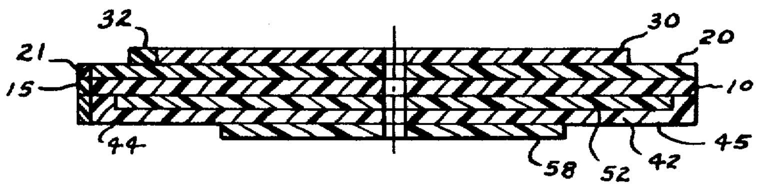
FIG. 1 is a cross-sectional, assembly-type view of the improved air navigation computer of the present invention, illustrating the operative relation between the various components thereof.
Figure 2:
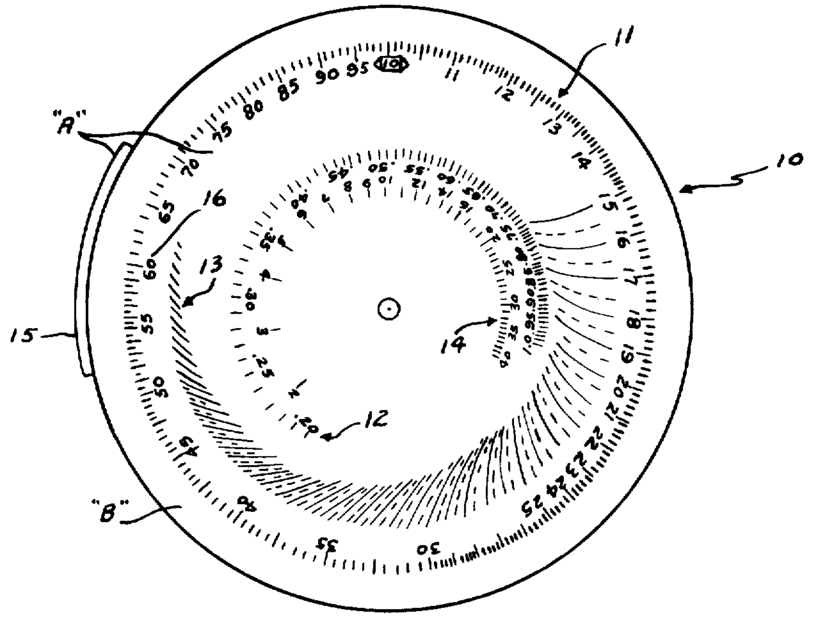
FIGS. 2, 3 and 4, respectively, represent top plan views of the uniquely-arranged, bottom, central and upper disc members comprising the three-disc arrangement of the calculator side-mechanism of the computer of FIG. 1.

Referring generally to the drawings and, in particular, to FIG. 1 thereof, the assembled condition of the improved air navigation computer of the present invention is illustrated as incorporating an improved six-element system which includes a computer-calculator side-mechanism having a first, bottom and logarithmic-distance/speed, scale-inscribed disc member 10, a second, central and logarithmic-time, scale-inscribed disc member 20, and a third, upper and equivalent-calibrated air speed cursor assembly-disc member 30. A computer-wind side-mechanism is also shown that includes a fourth, trigonometric logarithmic-scale-inscribed disc member 52, a fifth, relative bearing cursor assembly-disc member 42, and, finally, a sixth, compass indicator-disc member 58. In FIG. 2, the aforementioned first disc member 10 of the computer-calculator side is shown as being inscribed with an outer, standard logarithmic-distance/speed scale, indicated generally at 11, a Mach number scale at 12, a compressibility scale at 13 and a temperature error scale at 14. An important feature of this first disc member 10 is the incorporation, on a portion of the circumference thereof, of a first, 45 degree arc segment extension, indicated at 15. The printed data on the first disc member 10 is specifically oriented to radially align the logarithmic value of "60", indicated at the reference numeral 16, through the center of the said arc segment extension 15.

The aforementioned first disc member 10 consists of a circular configuration which, in one form thereof, incorporates a 2⅛ inch radius, except for the arc segment extension 15 which extends to a 2-3/16 inch radius. Disc member 10 may also be constructed of a white plastic material outward to the 1 27/32 inch radius, and is transparent from the 1-27/32 inch radius outward to the circumference. Arc segment extension 15 is also constructed of a white plastic material. The above-described white plastic areas of the disc member 10 have been generally indicated at "A", and the transparent circumferential portion thereof indicated at "B". The indicia and numerals of the standard logarithmic-distance/speed scale 11 are inscribed on disc member 10 from the 1-27/32 inch radius inward to the 1-21/32 inch radius and, as noted hereinbefore, the log value of "60" thereon is radially aligned with the center of the arc segment extension 15.

The compressibility scale 13 consists of a series of curves, clearly depicted in the view of FIG. 2, which are disposed on the first disc member 10 further inwardly of the logarithmic scale 11 and are arranged in multiples of five nautical miles, indicated by the dashed lines, and ten nautical miles, indicated by the solid lines. These compressibility curves 13, which naturally reflect the effect of air compressibility on calibrated air speed, extend between the logarithmic values representing 150 nautical miles per hour through 661.7 nautical miles per hour, and from the 1-78/32 inch radius inwardly to the 1-3/32 inch radius. The curve for these lines may be mathematically computed from 0 to 50,000 feet pressure altitude, or to Mach number 1, whichever occurs first. From the outer edge of each line inward, each 3/32 inch radius measurement represents 10,000 feet pressure altitude.

The indicia and numerals of the Mach number scale 12 are inscribed inwardly from the 1-3/32 inch radius to the 31/32 inch radius. Moreover, this scale, which is positioned further inwardly of compressibility scale 13, has been oriented clockwise on a 168 degree angle from the outer, logarithmic scale values that represent the standard day temperature and zero pressure altitude true air speeds. Furthermore, each one-hundredth Mach values is inscribed from a Mach number of 0.20 to 1.0. If desired, Mach number scale 12 could be extended past 1.0. Finally, the temperature error scale 14, which is inscribed on the first disc number 10 (FIG. 2) further inwardly of the Mach number scale 12, incorporates indicia and numerals that represent indicated temperature error for values varying between two and 40 degrees. The scale 14 is oriented clockwise on a 12° angle from the Mach number scale 12.

Figure 3:
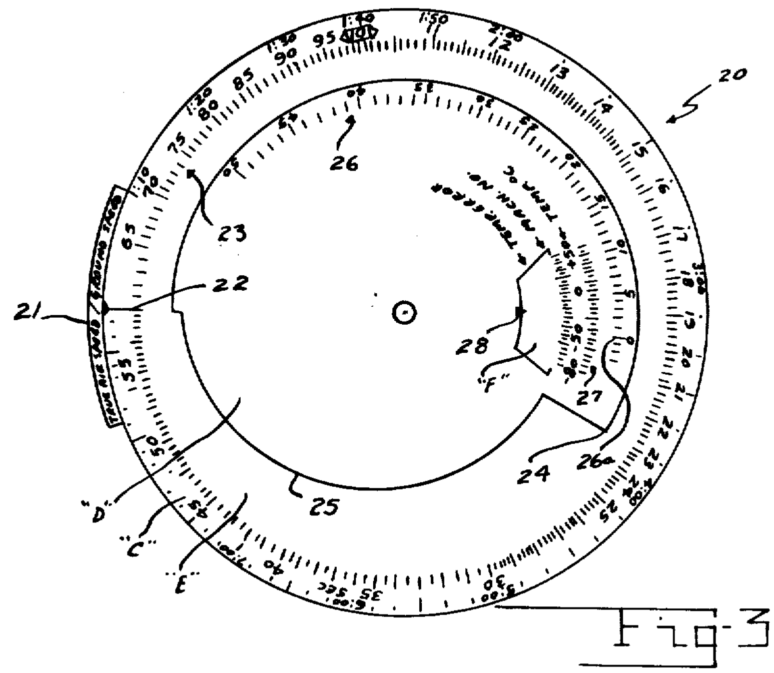

The second, central disc number 20, seen in detail in FIG. 3, and which likewise is of a circular configuration, has a principal radius of 2⅛ inches, the same as that of first disc member 10, and also incorporates a second, 45° arc segment extension on a portion of its circumference, as is indicated at 21. This arc segment extension 21 forms a unique part of the present invention, in the manner to become self-evident hereinafter, and extends further outwardly to a radius of 2-3/16 inches. It is, moreover, inscribed with the notation, "-TRUE AIR SPEED/GROUND SPEED" and further incorporates an index at 22 that is centered over, and is radially aligned with a value of "60" (denoting 60 minutes or 1 hour) located on a second, standard logarithmic-time scale, indicated generally at the reference number 23. Log-time scale 23, which is inscribed on the second, disc member 20 nearly adjacent the circumference thereof, further incorporates indicia and numerals that extend from the 1-27/32 inch radius outward towards the disc-circumference.

The above-described second disc member 20 is fabricated with both white plastic portions, indicated at "C" and "D", and transparent portions at "E" and "F" to permit selected portions of the flight data on the first disc member 10 to be visible therethrough, when the said second disc member 20 is mounted on top of the first disc member 10 during the assembly thereof, which assembly will be further described hereinafter. One of the said transparent disc portions, namely, that indicated generally at "E", extends from the one hour logarithmic indice, at 22, clockwise to the 23.25 logarithmic minute value, at 24, and inward from the 1-27/32 inch radius to the 1-20/32 inch radius. From said 1-hour indice 22, transparent portion "E" extends to the same 23.25 log value at 24 from the 1-27/32 inch radius to a curved arc (25) inner radius of varying dimensions, ranging from a 1-18/32 inch radius at the 1-hour indice 22 to a 1-3/32 inch radius at the log value of 23.25, at 24. Inward from the 1-18/32 radius each 3/32 inch value represents 10,000 feet pressure altitude, with zero altitude represented at the 1-hour indice 22 and 50,000 feet represented at the 23.25 log value, at 24. All intermediate points on this curved arc 25 may be mathematically computed from an equivalent air speed formula.

The foregoing second, disc member 20 further incorporates a density altitude scale, indicated generally at 26, which density altitude scale 26 incorporates indicia and numerals that are inscribed between the 1-15/32 inch radius and the 1-20/32 inch radius, and which vary between values from −3,000 feet to a +50,000 feet. This scale 26 is oriented counterclockwise with the zero altitude indice, at **26*a*, inscribed on the 186° angular measurement from the 1-hour log indice at 22. A temperature scale 27, in degrees centigrade, with values inscribed at 5° intervals from −80° to a +50°, and with two sets of indicia, is also inscribed on the second disc member 20 further inwardly of a portion of the density altitude scale 26. Scale 27 is oriented with the +15° C value located on a 168 degree angular measurement clockwise from the 1-hour log value indice 22**.

The previously-mentioned transparent portion "F" of the second disc member 20 actually consists of a combination Mach number and temperature error window that is marked with the notations "TEMP. ERROR" and "MACH. NO." at the appropriate radial positions to the right of the said window. A temperature error index is located, as seen at 28, on the inner edge of the window "F" and oriented radially on a 180 degree angle from the 1-hour log indice 22.

Figures 4, 5:
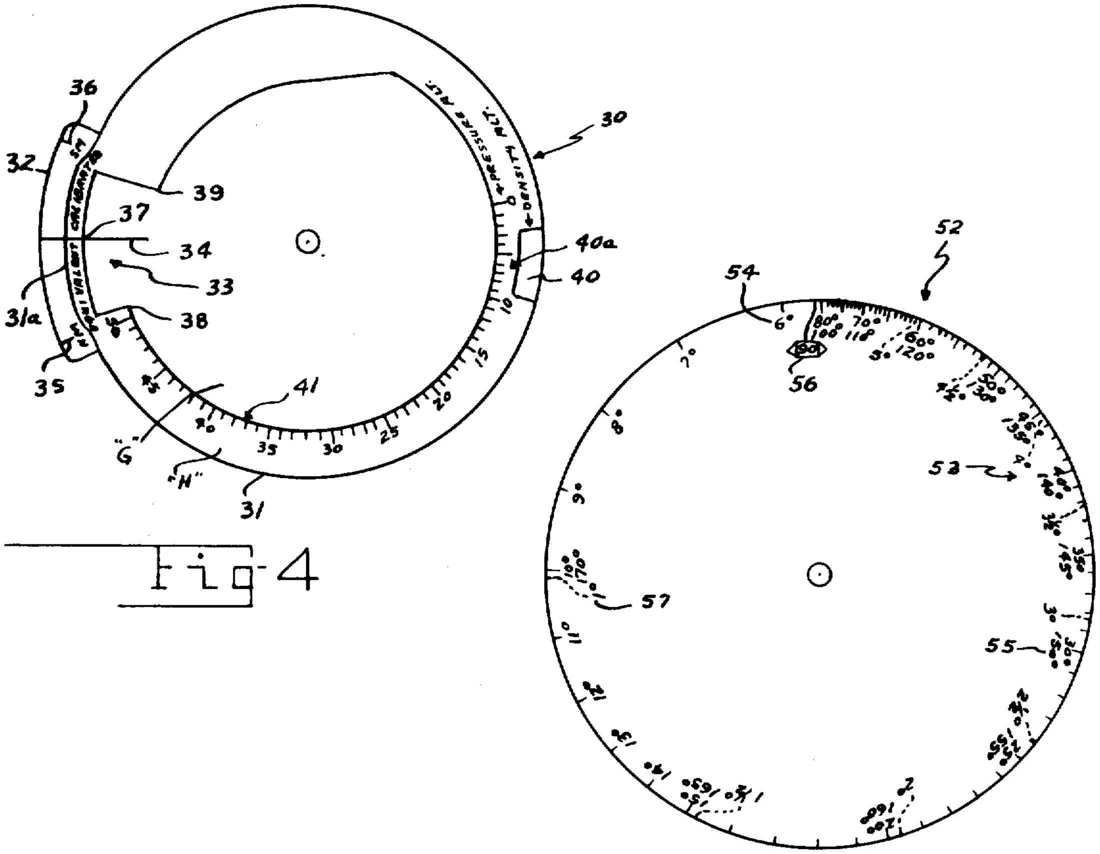
FIGS. 5, 6 and 7, respectively, represent other top plan views illustrating details of the bottom, central and upper disc members comprising the improved three-disc arrangement of the wind side-mechanism of the computer of FIG. 1.

Referring particularly to FIG. 4, the third, upper-computer-calculator side-disc member of the present invention is indicated generally at 30 as consisting essentially of a principal disc-body portion at 31 having an integral, arcuate body-extension at **31*a*, and a unique 55 degree arc segment extension at 32 that is transparent and is formed to a portion of the circumference of the disc-body portion 31 at, and encompassing the said arcuate body-extension 31*a*. The third disc member 30, which is circular in configuration and predominantly transparent, has a radius of 1-20/32 inches, except for the arc segment extension 32 that is further extended outwardly to a radius of 1-27/32 inches. The aforesaid disc-body-extension 31a and arc segment extension 32, along with a cursor line at 34, comprise one of the principal features of the present invention; namely, a novel combined equivalent-calibrated air speed cursor assembly, indicated generally at the reference numeral 33. For this purpose, the said cursor line 34 is employed to bisect the arc segment extension 32 on a constant radial from the outer edge thereof inwardly to the 1-3/32 inch radius. In addition, cursor line 34 further bisects a transparent area of the third disc member 30, indicated generally at "G", that is 38° in width and extends inwardly from the 1-18/32 inch radius, indicated generally at 37, to the 1-11/32 inch radius and the 1-1/32 inch radius counterclockwise and clockwise from the cursor line 34, as indicated respectively at 38 and 39**.

From the outer edge of the above-noted arc segment extension 32 inward to the 1-21/32 inch radius are inscribed nautical and statute mile indicia, identified by the notations "NM" and "SM" that are respectively indicated at 35 and 36, which indicia may be respectively located on the 0.8684 and 1.1516 logarithmic ratio values from the cursor line 34. To complete the notations of this assembly 33, the words "EQUIVALENT" and "CALIBRATED" have been inscribed on the previously indicated arcuate body-extension **31*a* to the left and right, respectively, of the cursor line 34. These words extend between the 1-21/32 inch radius and the 1-18/32** inch radius.

Third, upper disc member 30 additionally incorporates a transparent and 18° wide, density altitude window at 40 (FIG. 4) that is centered on a 186° angle measured clockwise from the cursor line 34 and is further located and extends from the outer edge or circumference of the disc-body 31 inward to the 1-15/32 inch radius. The center inner edge of the window 40 is inscribed with an indice at **40*a*. Finally, a pressure altitude scale, at 41, is inscribed on a white, outer disc-circumferential portion, indicated generally at "H", of the third disc member 30. The indicia and numerals of the scale 41 extend clockwise from 0 to 50,000 feet on the 1-11/32 inch radius outward to the 1-16/32 inch radius. The 1,000 foot intervals of this scale have been calibrated, referencing the density altitude and temperature scales, at 26 and 27** in FIG. 3, to reflect equal pressure and density altitudes at standard atmosphere temperatures.

In combining the above-described three-disc arrangement comprising the improved computer-calculator side, the second disc member 20 is placed over, and is rotatable relative to, the first disc member 10 and thereafter the third disc member 30 is assembled to the top surface of the second disc member 20, as is depicted in the view of FIG. 1. Although the new and novel calculator mechanism of the present invention is of general applicability and therefore may be utilized to replace the calculator side of existing air navigation computers, the following additional description thereof is made in connection with its preferred use, and novel combination with the improved "wind" side-mechanism of applicant's novel computer, described and claimed in the previously referred to copending patent application, Ser. No. 40,062, filed on May 25, 1970, on an invention entitled, "AEROTRACK: An Air Navigation Triangulation Computer". Initially, to make the aforementioned "AEROTRACK" device specifically compatible with the present computer-calculator side, the previously-described second, central-calculator side-disc member 20 incorporates a second logarithmic-distance/speed scale on its reverse side, as is indicated generally at 30a in FIG. *3a*. Again, the reverse side of the arc segment extension formed on a portion of the circumference of the said second disc member 20 is indicated at the reference numeral 21. The scale 30*a* consists of a standard logarithmic scale that is used as a component of the wind side-mechanism of the present computer. The indicia and numerals of this scale 30*a* extend inward to the 1-29/32 inch radius, with the logarithmic value of "60", at 30*b*, again, being centered on the arc segment extension 21 and therefore being aligned on the same radial as in the case of the index 22 of the previously-noted logarithmic value of "60" inscribed on the opposite or front, calculator-side-logarithmic scale 23 (Note FIG. 3). Thus, the larger radius of the scale 30*a* (1-29/32 inches) does not interfer with the transparent portions "E" and "F" of the second disc member 20 (Note FIG. 3).

Although the reverse side of the calculator-first, bottom disc member 10 (FIG. 2) is left blank, a second component of the computer-wind side-mechanism is cooperatively related and rigidly affixed thereto in the following unique manner. This is the relative bearing cursor assembly-component comprising the fifth disc member involved with the present invention; namely, the disc member indicated generally at 42 in FIGS. 1 and 6 (Note, the fourth disc member will be described later). Said fifth, relative bearing cursor assembly-disc member 42 is somewhat similar to, but is further modified in an improved and novel manner over its counterpart computer-wind side component disclosed in the aforementioned "AEROTRACK" invention, to thereby specifically accommodate it to the improved computer-calculator side-mechanism of FIGS. 2, 3 and 4 of the present disclosure. As clearly illustrated in the aforesaid FIG. 6, said fifth disc member 42 incorporates a main, white and circular disc-body portion at 43, which has a 1-15/32 inch radius, and a pair of 45° arc segment or tip-extensions, indicated respectively at 44 and 45 as extending outwardly and in opposed relation to each other to the 2-3/16 inch radius and the 2⅛ inch radius. Disc member 42 is preferably made of a white plastic material, except for the arc tip-extensions 44 and 45 which are transparent.

The aforementioned arc tip-extensions 44 and 45 are laminated and therefore rigidly fixed to the reverse side of the first, calculator side-disc member 10, and thus adjustment of the latter element automatically effects equal adjustment of the fifth disc member 42 for an improved and novel purpose to be further described hereinafter. To facilitate the lamination of only the arc tip-extensions 44 and 45 to the reverse side of the first disc member 10 and thereby provide for another unique feature of the present invention, as will be subsequently described hereinafter in detail, the overall thickness of the fifth disc member 42 is varied in the following manner. Outward to the 1-29/32 inch radius, indicated by the reference numerals at 44*a* and 45*a* in FIG. 6, of the arc tip-extensions 44 and 45, the disc member 42 is 1/32 inches thick. From this 1-29/32 inch radius to the outer edge of each arc tip-extension 44, 45, the thickness of disc member 42 is enlarged to 1/16 of an inch, with the increased thickness occurring on the underside of this disc and its upper or top surface remaining flat, as is seen particularly in FIG. 1.

The longest arc tip-extension 44 is inscribed with the notation, "TRUE AIR SPEED/GROUND SPEED", similar to the arc segment-extension 21 of the second, calculator side-disc member 20 (Note FIG. 3), which notation extends from the outer edge thereof inward to the 2⅛ inch radius. A relative bearing scale, indicated generally at 46, is inscribed nearly adjacent the circumference of the disc member 42, with indicia at two degree intervals outward from the 1-3/16 inch radius to the 1-9/32 inch radius, and numerals at each 10° interval between the 1-9/32 inch radius and the 1⅜ inch radius. Relative bearing scale 46 is oriented with the 180° index, depicted at the reference numeral 47 and marked by the word "COURSE", aligned on the radial that bisects the longest 45° arc tip-extension 44. The said numerals extend clockwise and counterclockwise, in descending order, from 170° through ten degrees. In practice, values less than 90° may be color coded with a green tinted background, and values greater than 90° may have an amber tinted background. Between the 1⅜ inch radius and the 1-15/32 inch radius the word "-DRIFT" and the numerals "10", "20" and "30", representing degrees of drift, are inscribed in both clockwise and counterclockwise directions. The drift index at 48 is radially aligned with the course index 47. Further, arc tip-extension 44 is bisected by a radial cursor line, shown at 49, extending between the drift index 48 and the true air speed/ground speed index 50. Opposing arc tip-extension 45 is likewise bisected by a second, radial cursor line at 51.

A fourth, intermediately-positioned disc member, comprising another component of the computer-wind side-mechanism, is indicated generally at 52 in FIG. 5. Disc member 52 is non-transparent, predominantly white and has a 1-29/32 inch radius. Its outer edge is inscribed with a trigonometric logarithmic scale, indicated generally at 53, which is based on cosecant values. Numerals less than 90° and descending through

6°, indicated at 54, are inscribed between the 1-26/32 inch radius and the 1-23/32 inch radius, whereas numerals greater than 90° , such as the 150° value indicated at the reference numeral 55, are inscribed between the 1-23/32 inch radius and the 1-20/32 inch radius. Finally, the numerals for 90°, indicated at 56, and for each ½° value from 5° through 1°, indicated at 57, are inscribed between the 1-20/32 inch radius and the 1-16/32 inch radius. Indicia for values from 5° through 1° are, as clearly depicted in the aforesaid FIG. 5, displayed as dotted lines. The numerals less than 90° through 6° may be color coded with, for example, a green tinted background, and the numerals greater than 90° may have an amber tinted background. The remainder of the disc member 52 is white.

Figures 7, 8, 9:
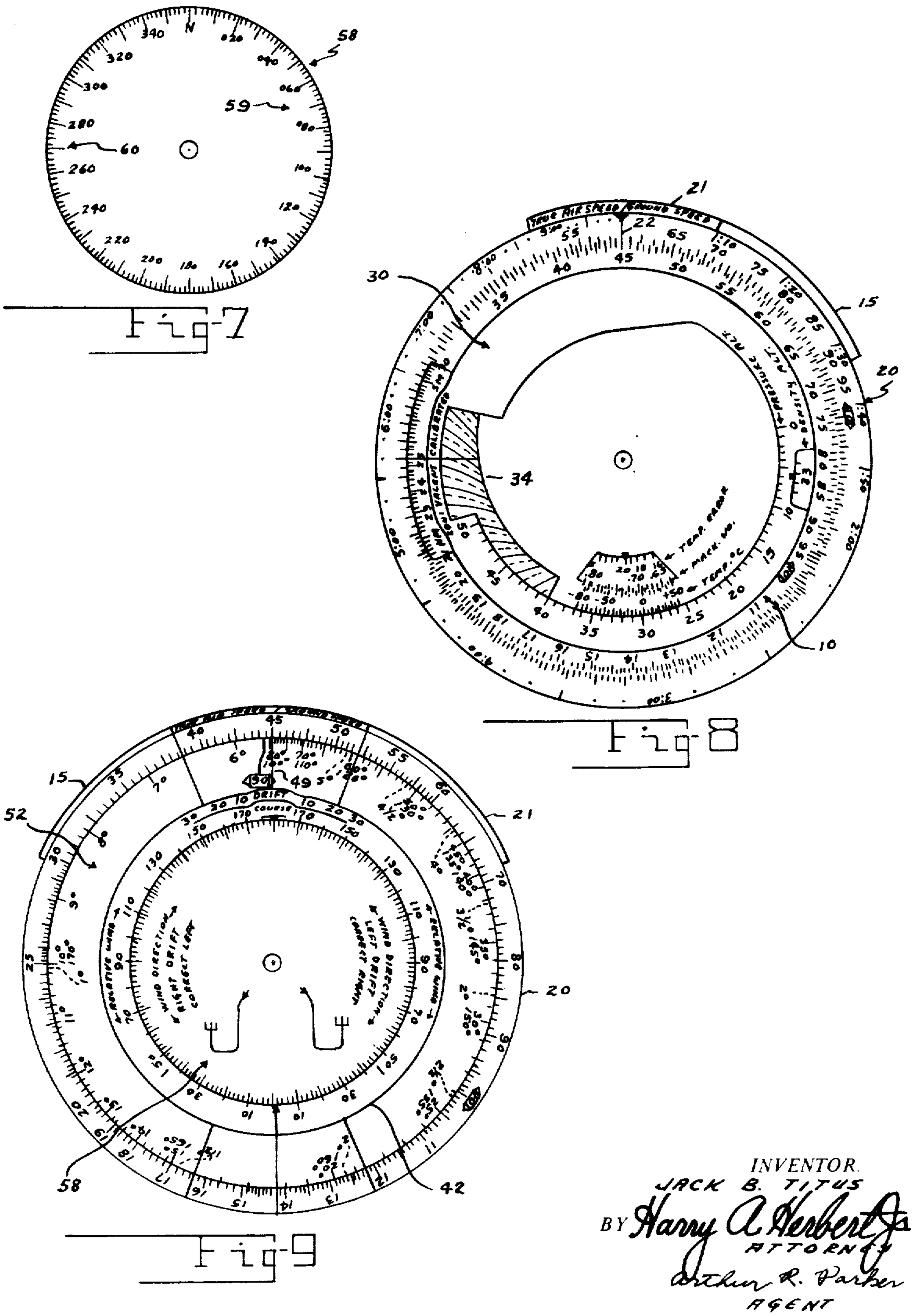
FIG. 8 is a partly assembled top view of the present computer, illustrating further details of the operating relationships between the various components comprising the improved calculator side-mechanism of the invention.
FIG. 9 is another partly assembled top view of the present computer, illustrating further details of the operating relationships between the various components of the modified wind side-mechanism of the present invention.

The sixth disc member, indicated generally at 58 in FIG. 7, represents a standard compass indicator-disc that is transparent, has a radius of 1-3/16 inches and constitutes the topmost or upper component of the present computer when turned to its wind side. From the outer circumference inward to the 1-3/32 inch radius, disc member 58 is inscribed with indicia at 2° intervals comprising a compass scale, indicated generally at the reference numeral 59. Compass scale 59 further incorporates numerals at 10° intervals, as for example that indicated at 60 for a compass reading of 270°, that are inscribed between the 1-3/32 inch radius and the 1-inch radius.

The novel air navigation computer of the present invention may be assembled in the following manner. Initially, the fourth disc member 52 (FIG. 1) may be inserted between the underside of the fifth disc member 42 and the reverse side of the first disc member 10. Thereafter, the arc tip-extensions 44 and 45 of the said fifth disc member 42 may be subsequently laminated to the reverse side of the first disc member 10 with, as noted hereinbefore, the cursor line 49 (Note FIG. 6) of the longest arc tip-extension 44 (denoting true air speed/ground speed) being radially aligned with the center of the arc segment-extension 15 of the first disc member 10. As previously described, the latter radial alignment results in placing the said cursor line 49 on the same radial that is aligned with the log value of "60" on the first disc member 10.

A standard-type of center fastening rivet (not shown) may be used to hold all components of the present computer together. After the aforementioned insertion assembly operation of the fourth disc member 52 and the lamination of the arc tip extensions 44 and 45 of the fifth disc member 42 to the reverse side of the first disc member 10, the second disc member 20 may be placed over first disc member 10. Subsequently, the third disc member 30 may be positioned on top of the second disc member 20 to thereby complete the calculator or true air speed side of the computer. Thereafter, the sixth disc member 58 (FIGS. 1 and 7) may be mounted over the previously-assembled, fifth disc member 42 to thus complete the wind side of the present computer.

The new and improved hand-held, air navigation computer of the present invention may be operated in the following essentially two principal step manner to solve for both true air speed, ground speed and drift correction angle:

1. To determine true air speed with a known calibrated air speed, pressure altitude and ambient air temperature:
   a. Place pressure altitude on pressure altitude scale 41 (FIG. 4) over ambient temperature on temperature scale 27 (FIG. 3). This setting establishes the logarithmic ratio between true air speed and equivalent air speed, as reflected by the relative position between the true air speed index 22 (FIG. 3) and the cursor line 34 (FIG. 4).
   b. Then, place the calibrated air speed found on the logarithmic-distance/speed scale 11 (FIG. 2) under the cursor line 34 (FIG. 4) and adjust to equivalent air speed, compensating for air compressibility, by moving the logarithmic-distance/speed scale 11 clockwise the amount indicated by the appropriately-positioned compressibility lines comprising the compressibility scale 13 (FIG. 2). It is noted that air compressibility is insignificant at relatively low calibrated air speeds below 150 knots.
   c. Read true air speed at the true air speed index 22 (FIG. 3) on the logarithmic-distance/speed index scale 11 (FIG. 2). Note that solving for true air speed simultaneously solves Mach number and density altitude, as well as equivalent air speed.
2. To determine true air speed from a known calibrated air speed, pressure altitude and indicated air temperature:
   a. Place pressure altitude over indicated air temperature, using the same temperature scale 27 as in the previously described procedure.
   b. Then, place the calibrated air speed on log scale 11 under cursor line 34 and adjust to equivalent air speed.
   c. Read temperature error from the temperature error scale 14 (FIG. 2) appearing through the transparent window "F" (FIG. 3) at the temperature error index 28. Then, repeat the procedure for determining true air speed described in steps 1(a), (b) and (c) above.

The above-described solution of true air speed by use of the new and improved computer-calculator side-mechanism of the present invention further results in the automatic and simultaneous setting of the same true air speed data appearing directly under the fifth disc member-cursor line 49 and found on the log scale 30a. This simultaneous placement of the previously-computed true air speed under the cursor line 49 has been uniquely assured by the previously-described modified and improved computer-wind side-mechanism. This novel feature is ensured and specifically provided for partly by the incorporation of the logarithmic-distance/speed scale **30*a* (FIG. 3*a*) on the reverse side of the second disc member 20 with the log value of "60" thereon being directly aligned with the same value indicated at 22 and representing one-hour on the front-side log scale 23 (FIG. 3). As has been previously-described, this uniquely-positioned log scale 30*a* has been placed in a novel and improved combination with the relative bearing and cursor assembly-mounted, fifth disc member 42 (See FIG. 6). The latter element uniquely incorporates the previously noted, opposing arc tip-extensions 44 and 45 which are laminated to the reverse side of the first disc member 10 (FIG. 2) with the cursor line 49 inscribed on the longest of the said arc tip-extensions being directly aligned over the same log value of "60" on the aforesaid log scale 11 (FIG. 2). Thus, any adjustment of the log scale 11 on the first disc member 10 to bring the calibrated air speed under the cursor line 34 (FIG. 4), for example, to thereby determine the true air speed at the index 22 (FIG. 3), in the manner hereinbefore described, will automatically adjust the fifth disc member 42 (FIG. 6), affixed to the reverse side of disc member 10, and the cursor line 49 thereof the same angular amount relative to the log scale 30***a* on the reverse side of disc member 20 and thus the same true air speed, previously computed on the calculator side, will also be displayed on the computer-wind side, as was previously-noted. This improved feature greatly facilitates the preparation of the computer for the solution of ground speed in a logical sequence.

After having determined true air speed in the simplified manner described hereinbefore, the ground speed may be computed by use of the computer-wind side-mechanism in the following manner:

1. Set true air speed and true course under the cursor line 49 (FIG. 6), using the logarithmic-distance/speed scale 30a and compass scale 59 respectively inscribed on the reverse side of disc member 2 (FIG. 3*a*) and on compass indicator-disc member 58 (FIG. 7).

Figure 3A:
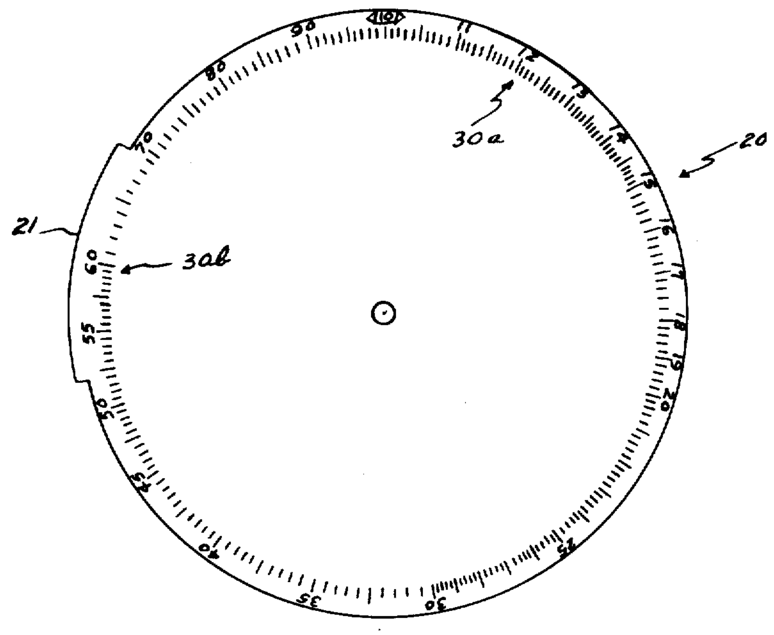
FIG. 3a is a bottom plan view of the central-calculator side-disc member of FIG. 3, illustrating details of a standard logarithmic scale inscribed on the reverse side thereof.

2. Read the relative wind angle opposite the wind direction, using respectively the relative bearing scale 46 (FIG. 6) and the compass indicator scale 59 (FIG. 7), and set this relative wind angle opposite the wind velocity, using the trigonometric logarithmic scale 53 (FIG. 5) and the logarithmic-distance/speed scale 30*a* (FIG. 3*a*).

3. Insuring that the true air speed remains under the cursor line 49, read the degrees of wind drift under the cursor line 49 on the trigonometric-log scale 53.

Figure 6:
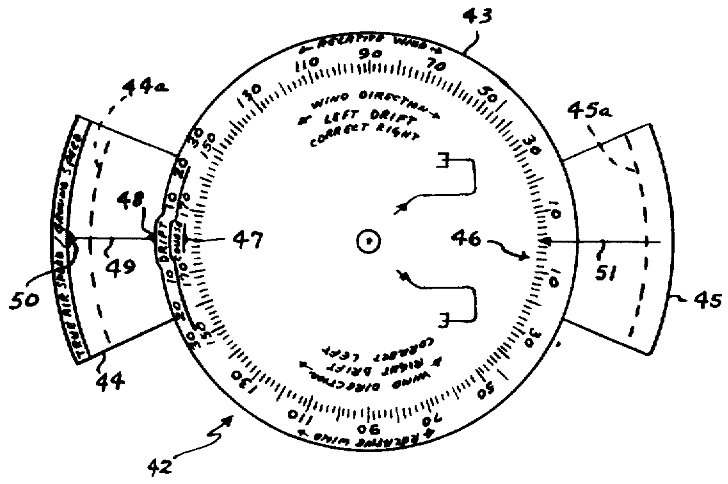

4. Add degrees of drift to the relative wind angle and place the total opposite the wind velocity on the log scale 30*a* by rotating the relative bearing cursor assembly-fifth disc member 42 (FIG. 6).

5. Read ground speed on the log scale 30*a* under the cursor line 49.

As in the case of the solution of true air speed, whereby this data is automatically placed on the computer-wind side, because of the uniquely-related combination-computer-calculator and wind side-mechanisms of the present invention, as previously described, the ground speed found by the above-described procedure is also automatically and simultaneously placed under the log value of "60" on the logarithmic-time scale 23 of the computer-calculator side-second disc member 20 (FIG. 3). This, of course, quickly prepares the computer for the solution of en-route time, speed and distance problems.

An example of the use of the present computer to illustrate the simultaneous display of true air speed on the computer-wind side, after its previous computation on the computer-calculator side, is shown in FIGS. 8 and 9. In FIG. 8, which illustrates the computer-calculator side, a true air speed of 450 mph is indicated at the index 22, whereas, in FIG. 9, this same true air speed of 450 mph has been automatically set under the index 49 of the relative bearing-cursor assembly-disc member 42 (FIG. 6). This action, of course, results from the simultaneous and equal rotation of the first, lower disc member 10 and the fifth, relative bearing cursor assembly-disc member 42.

It is noted that, although the improvement of the present invention has been described in connection with a specific previously-developed computer, it has general applicability to, and may be used with, and to modify other existing air navigation computers without departing from the true spirit or scope of the invention, as delineated in the attached claims.

I claim:

1. In a hand-held air navigation computer having both wind and calculator sides, flight data-producing mechanism comprising means on said computer-calculator side for determining the true air speed of a selected aircraft, said means including a first, bottom disc member having a relatively enlarged, white-central disc portion extending outwardly to a relatively narrow, transparent-outer disc portion incorporating the disc-circumference, a first, arc segment-extension on a limited portion of the disc-circumference, a first, outermost, logarithmic-speed-distance scale inscribed at a first, predetermined radius corresponding to the juncture between, and extending entirely around, said white-central and transparent, outer-disc portions with the logarithmic value of "60" thereon being centered on said first, arc segment-extension, a first, intermediately-positioned compressibility scale for determining the effect of air compressibility on the calibrated air speed of the aircraft and comprising a plurality of curved lines respectively computed for pressure altitudes of from 0 to 50,000 feet and inscribed at selected nautical miles per hour intervals specifically related to, and extending in radially aligned and adjacent relation between the logarithmic values on said logarithmic-speed-distance scale representing from 150 to 661.7 nautical miles per hour, a second, intermediately-positioned Mach number scale disposed on said first, bottom disc member in-wardly of said compressibility scale and oriented clockwise at a first, predetermined angle to said logarithmic-speed - distance scale and a third, innermost, temperature error scale positioned further inwardly of said Mach number scale and oriented at a second, predetermined angle to said Mach number scale; and a second central disc member rotatably mounted over said first, bottom disc member and incorporating white, central and outer disc portions including the circumference thereof, a second, logarithmic-time scale inscribed on said white, disc-circumference portion at a second radius greater than that of the first, predetermined radius of the logarithmic-speed-distance scale of said first, bottom disc member and just large enough to place the indicia and numerals of said logarithmic-time scale precisely adjacent to, and outside of, said logarithmic-speed-distance scale over the transparent, outer-disc portion of said first disc member, and a second, arc segment-extension formed on a limited portion of the central disc-circumference and inscribed with a "TRUE AIR SPEED/GROUND SPEED" notation having an index centered over the logarithmic value of "60" on said last-named, logarithmic scale, said second, disc member further including a circumferentially disposed, transparent area bounded on its outer circumference by the inner circumference of said logarithmic-time scale and comprising on its inner circumference a first arcuate portion of constant radius and disposed clockwise between the said logarithmic value of "60" to the 23.35 logarithmic value and a second, oppositely disposed arcuate portion of varying radius and extending counterclockwise from the said logarithmic value of "60" to the said 23.25 logarithmic value, said second arcuate portion being computed from an equivalent air speed formula at periodic intervals thereon each representing a pressure altitude of 10,000 feet and extending in total extent from a zero pressure altitude-indice at the said logarithmic value of "60" to a pressure altitude of 50,000 feet at the said logarithmic value of 23.25, a density altitude scale positioned on said white-central disc portion just inwardly of the first arcuate portion of constant radius and oriented with its zero indice at a 186° angle from the said logarithmic value of "60", a combined transparent Mach number and temperature error window positioned inwardly of, and in somewhat spaced relation to said density altitude scale and a temperature scale interposed between a portion of said density altitude scale and said Mach number and temperature error window; said flight data-producing mechanism further comprising a third, upper disc member mounted on said second, central disc member and having a main, predominantly-transparent disc, central body portion with a white circumferential body portion incorporating a density altitude window adapted to be disposed over the density altitude scale of said second disc member, a pressure altitude scale in direct alignment with, and disposed outwardly of the temperature scale of said first disc member, and a combined equivalent-calibrated air speed cursor assembly comprising a third, transparent arc segment-extension disposed on a limited portion of said main disc body portion and a cursor line bisecting said arc segment-extension, said main disc body portion being inscribed with the notation "EQUIVALENT/CALIBRATED", representing air speed and respectively oriented counterclockwise and clockwise from, and immediately adjacent to said bisecting cursor line, and said third, arc segment-extension being inscribed with the notations, "NM" and "SM" located thereon at precomputed distances from said bisecting cursor line respectively measured counterclockwise and clockwise therefrom, from which statute miles may be quickly converted to nautical miles, said third, upper disc member being initially adjusted relative to said second, central disc member to align a selected pressure altitude with a predetermined ambient air temperature to thereby set a predetermined angle between the true air speed index inscribed on said second, central disc member and the cursor line of said third, upper disc member-equivalent-calibrated air speed cursor assembly; said first, bottom disc member being thereafter adjusted to bring the selected calibrated air speed as represented on the logarithmic-speed-distance scale directly under said cursor line thereby automatically exposing a limited portion of the compressibility scale through a transparent window of relatively limited area and formed through the transparent central body portion of said third, upper disc member substantially adjacent its arc segment-extension and further delineated by the second arcuate portion precomputed from, and representing equivalent air speed, said first, lower disc member being subsequently further adjusted in a clockwise direction an amount indicated by the relation between said cursor line and the curve of said compressibility scale intersecting therewith to automatically compensate for air compressibility and thus provide the quick adjustment of the selected calibrated air speed to an equivalent air speed to thereby ensure the accurate display of both calibrated and equivalent air speed at the cursor line, the true air speed at the reading on the logarithmic-speed-distance scale under the true air speed index on the said second, arc segment extension, and the further and simultaneous display of Mach number directly under the transparent Mach number and temperature error window of said second, central disc member and density altitude under the density altitude window of said third, upper disc member.

2. In a hand-held, air navigation computer as in claim 1, said flight data-producing mechanism further including apparatus on the computer-wind side for determining the ground speed of the selected aircraft, said apparatus including first means for automatically displaying the true air speed of the aircraft simultaneously with its previous computation on the computer-calculator side, and second means for applying a predetermined wind velocity and direction to the predetermined true air speed and the desired true course or track of the aircraft for thereby determining both the ground speed and the required wind correction angle; said first-named means comprising a true air speed-indicator element oppositely disposed relative to the reverse side of, and having an index in direct alignment with, the true air speed index of said second, central disc member, and a cursor-mounted element affixed to the reverse side of said first, lower disc member and having a radially extending cursor line centered on said first, arc segment-extension at the said logarithmic value of "60" for automatic adjustment to the same angular relation with the index of said true air speed-indicator element previously existing between the bisecting cursor line of said third, upper disc member and said second, central disc member-true air speed index, when the calibrated air speed on the logarithmic-speed-distance scale of the first, lower disc member has been adjusted to a position directly under said bisecting cursor line during the previous computation of the aircraft-true air speed.

3. In a hand-held, air navigation computer as in claim 2, said true air speed-indicator element comprising an additional logarithmic-speed-distance scale inscribed on the reverse side of said second, central disc member with the logarithmic value of "60" thereon being directly aligned with said first-named true air speed index.

4. In a hand-held, air navigation computer, as in claim 2, said cursor-mounted element comprising a combined relative bearing scale and cursor assembly having means affixed to the reverse side of said first, lower disc member.

5. In a hand-held, air navigation computer as in claim 4, said combined relative bearing scale and cursor assembly incorporating recessed means for retaining a fourth, trigonometric logarithmic scale-inscribed, circular disc member in rotatable and adjacent relation to the reverse side of said first, lower disc member.

6. In a hand-held, air navigation computer as in claim 5, said combined relative bearing and cursor assembly comprising a fifth, relative bearing scale-inscribed, circular disc member and cursor assembly-mounted means affixed between said fifth circular disc member and the reverse side of said first, lower disc member.

7. In a hand-held, air navigation computer as in claim 6, wherein said fifth, disc member incorporates said recessed means for retaining said fourth, disc member in said adjacent relation to said first, lower disc member.

8. In a hand-held, air navigation computer as in claim 6, said cursor-mounted means comprising a pair of oppositely-disposed cursor elements extending outwardly in opposite directions to said fifth, relative bearing scale-inscribed, disc member and respectively sealed to said first, lower disc member.

9. In a hand-held, air navigation computer as in claim 8, in which one of said pair of cursor elements includes an extended arcuate portion incorporating a "TRUE AIR SPEED/GROUND SPEED" notation with an index and cursor line positioned in radial alignment over the logarithmic value of "60" on the first, logarithmic-speed-distance scale inscribed on the front side of said first, lower disc member.

10. In a hand-held, air navigation computer as in claim 8, wherein said pair of cursor elements may each comprise an arc segment of predetermined width and integrally formed in extending relation from opposite sides of said fifth, relative bearing scale-inscribed, disc member.

* * * * *